United States Patent [19]
Farnam

[11] Patent Number: 4,463,704
[45] Date of Patent: Aug. 7, 1984

[54] APPARATUS FOR COATING LIQUID PENETRABLE ARTICLES WITH POLYMERIC DISPERSIONS

[75] Inventor: Robert G. Farnam, Lake Forest, Ill.

[73] Assignee: F. D. Farnam, Inc., Necedah, Wis.

[21] Appl. No.: 88,292

[22] Filed: Oct. 26, 1979

Related U.S. Application Data

[63] Continuation-in-part of Ser. No. 14,991, Feb. 26, 1979, abandoned, which is a continuation-in-part of Ser. No. 933,893, Aug. 15, 1978, abandoned.

[51] Int. Cl.³ .................. B05C 11/00; B05C 13/00
[52] U.S. Cl. ................................. 118/642; 118/58;
  118/70; 118/227; 118/239; 118/316; 118/324;
  118/643
[58] Field of Search ............ 427/290, 314, 316, 317,
  427/209, 211; 118/66, 641–643, 58, 70, 227,
  239, 316, 324

[56] References Cited

U.S. PATENT DOCUMENTS

| | | | |
|---|---|---|---|
| 2,627,482 | 2/1953 | Martin et al. | 427/314 X |
| 2,665,221 | 1/1954 | Grangaard | 427/316 |
| 2,702,761 | 2/1955 | Mannheim | 427/284 |
| 2,889,806 | 6/1959 | Conant | 118/66 X |
| 3,526,207 | 9/1970 | Nadelson | 118/500 |
| 3,632,383 | 1/1972 | Dominick et al. | 427/316 X |

FOREIGN PATENT DOCUMENTS

| | | | |
|---|---|---|---|
| 1017484 | 1/1966 | United Kingdom | 427/314 |
| 1351084 | 4/1974 | United Kingdom | 427/211 |

Primary Examiner—Evan K. Lawrence
Attorney, Agent, or Firm—Mason, Kolehmainen, Rathburn & Wyss

[57] ABSTRACT

Apparatus is provided to allow a liquid penetrable material, such as a gasket part made of compactible gasket material, while being conveyed flatwise along a given path, to be coated with a liquid dispersion of polymer or polymers, by first preheating the liquid penetrable material to a temperature sufficient to prevent any substantial penetration of liquid into the material when the material at the preheated temperature is coated with the liquid dispersion of polymer or polymers. The preheated material is then coated with the liquid dispersion of polymer or polymers in an amount sufficient to form a fluid-impermeable barrier over the material and the coated material is supported on a plurality of pointed projections through a drying section until the coating is in a tack-free condition. After drying the material to a tack-free condition, it is supported on a conveyor through a curing station to cure the coating. Thereafter the material is delivered by suitable conveyors to an inspection and packaging station, but may be passed en route through another coating station, this time to receive a suitable release coating.

15 Claims, 29 Drawing Figures

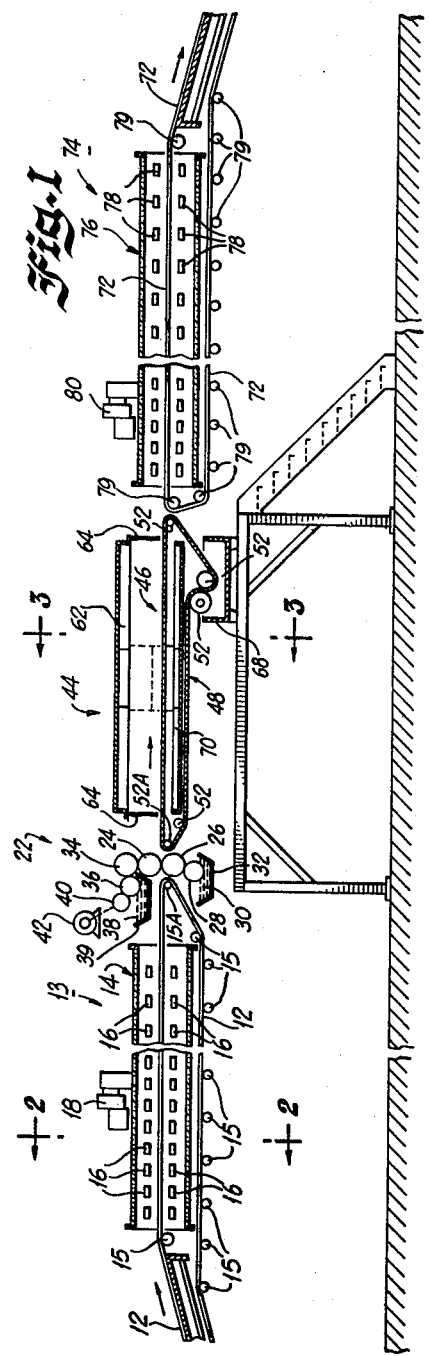
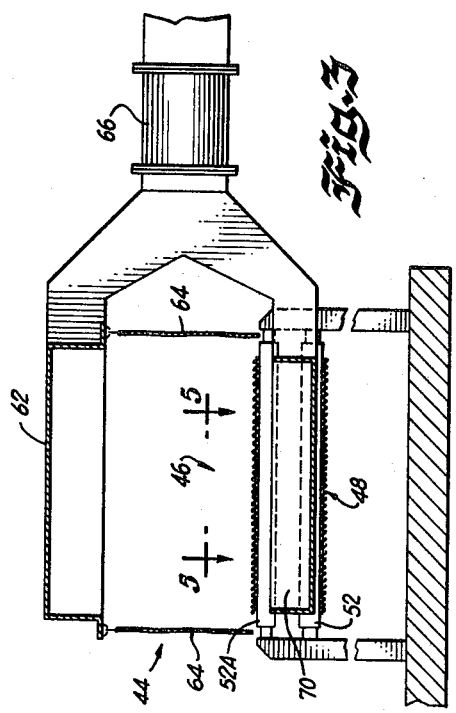
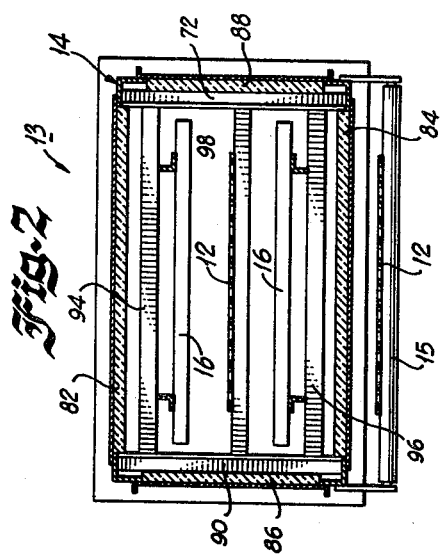

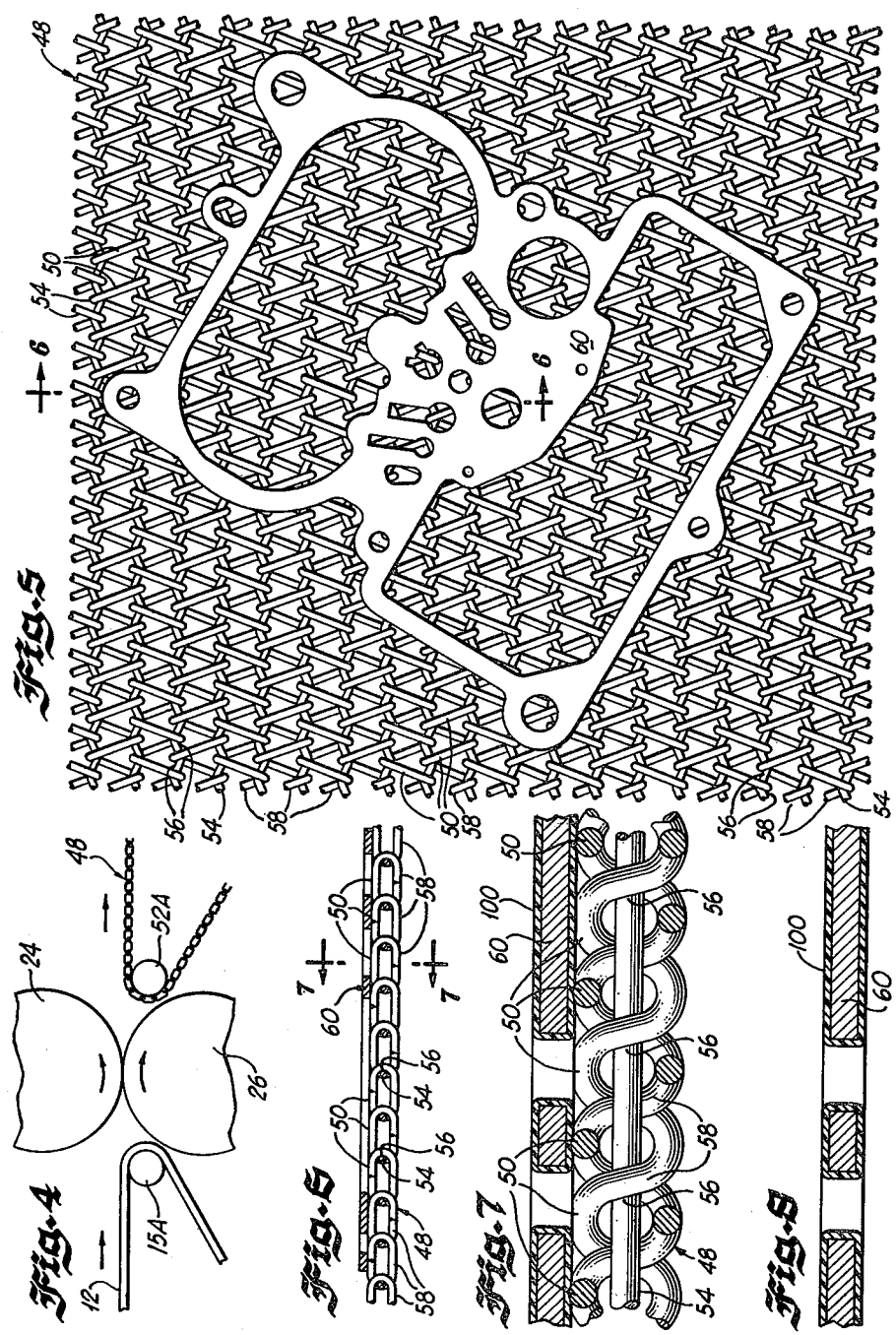

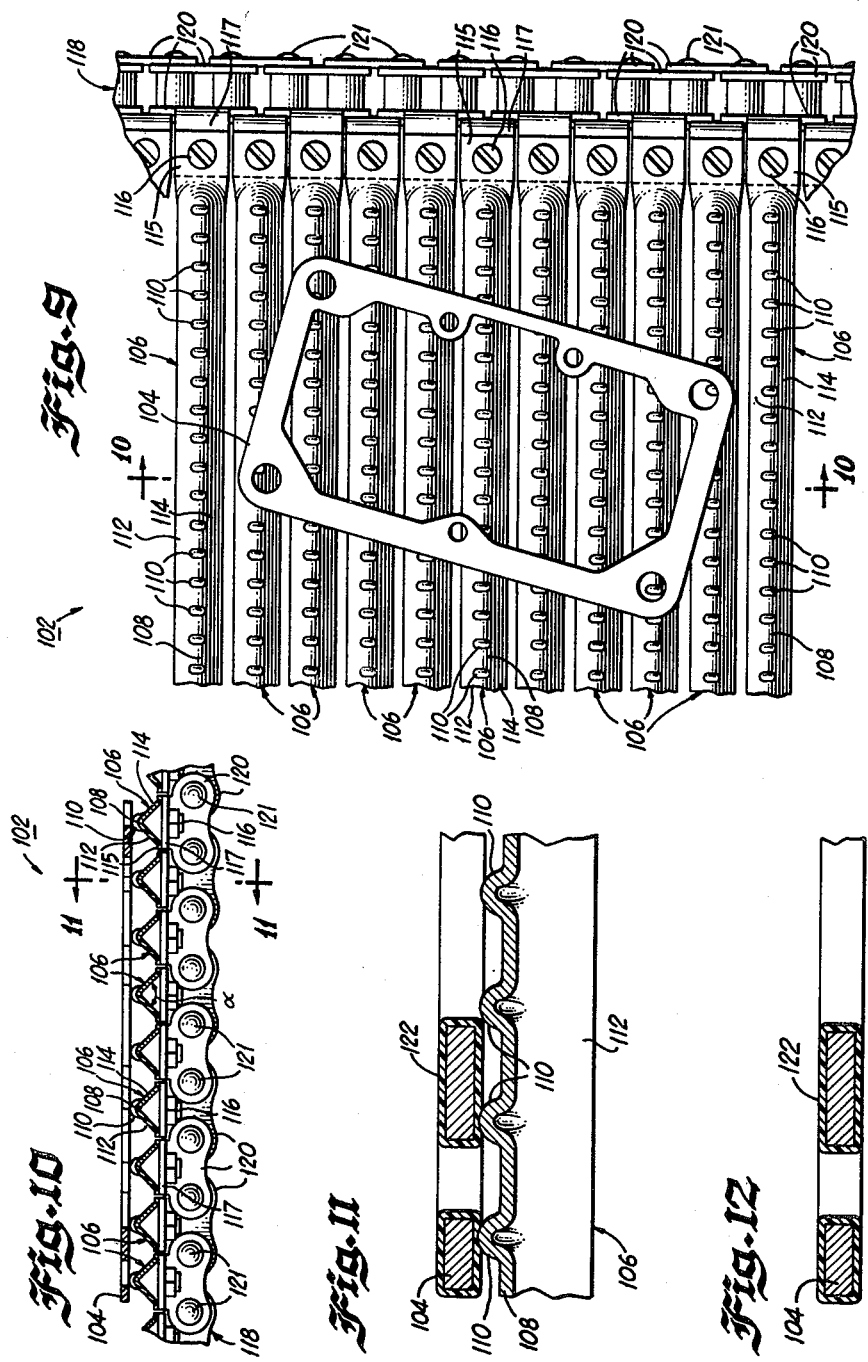

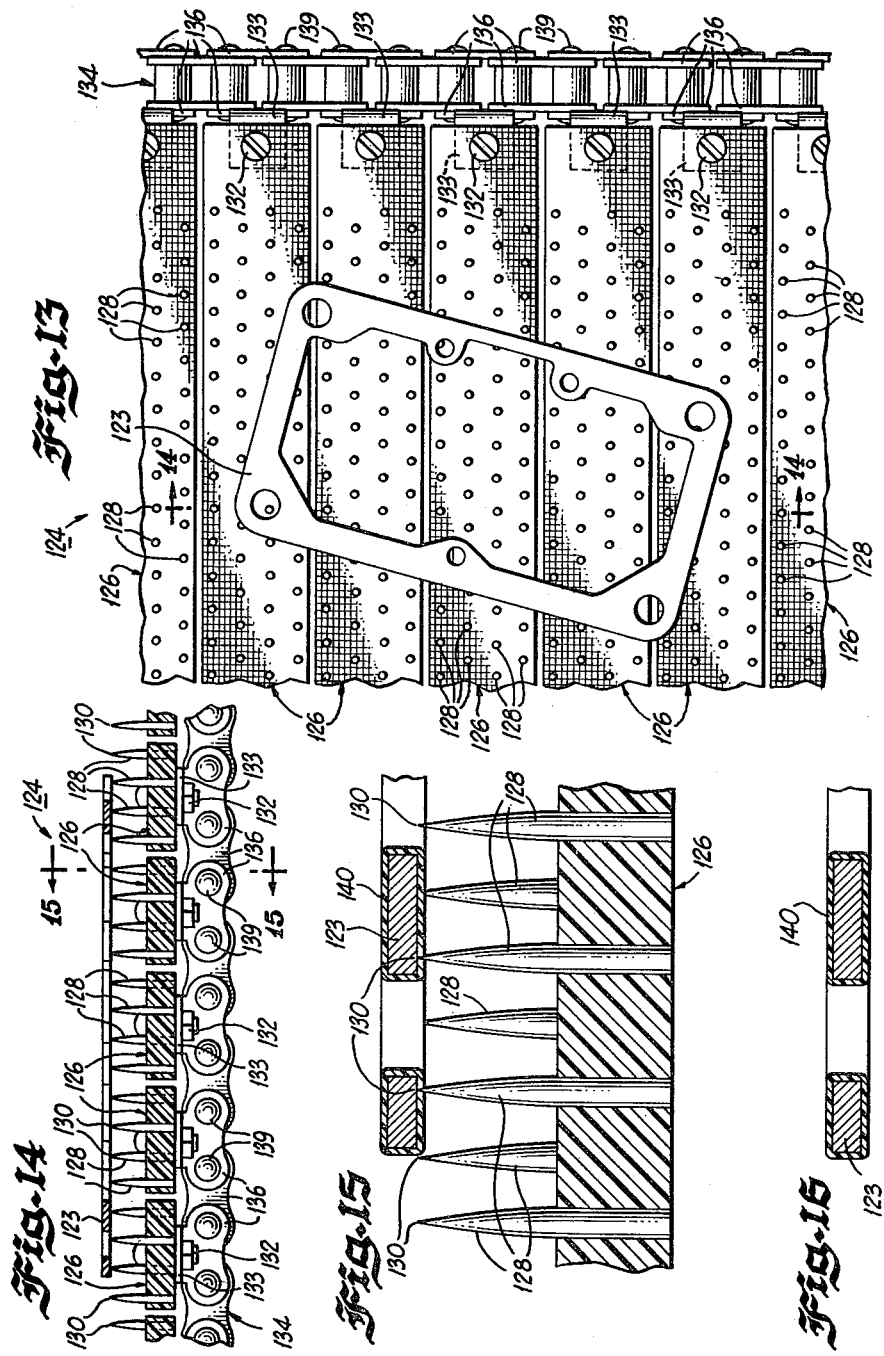

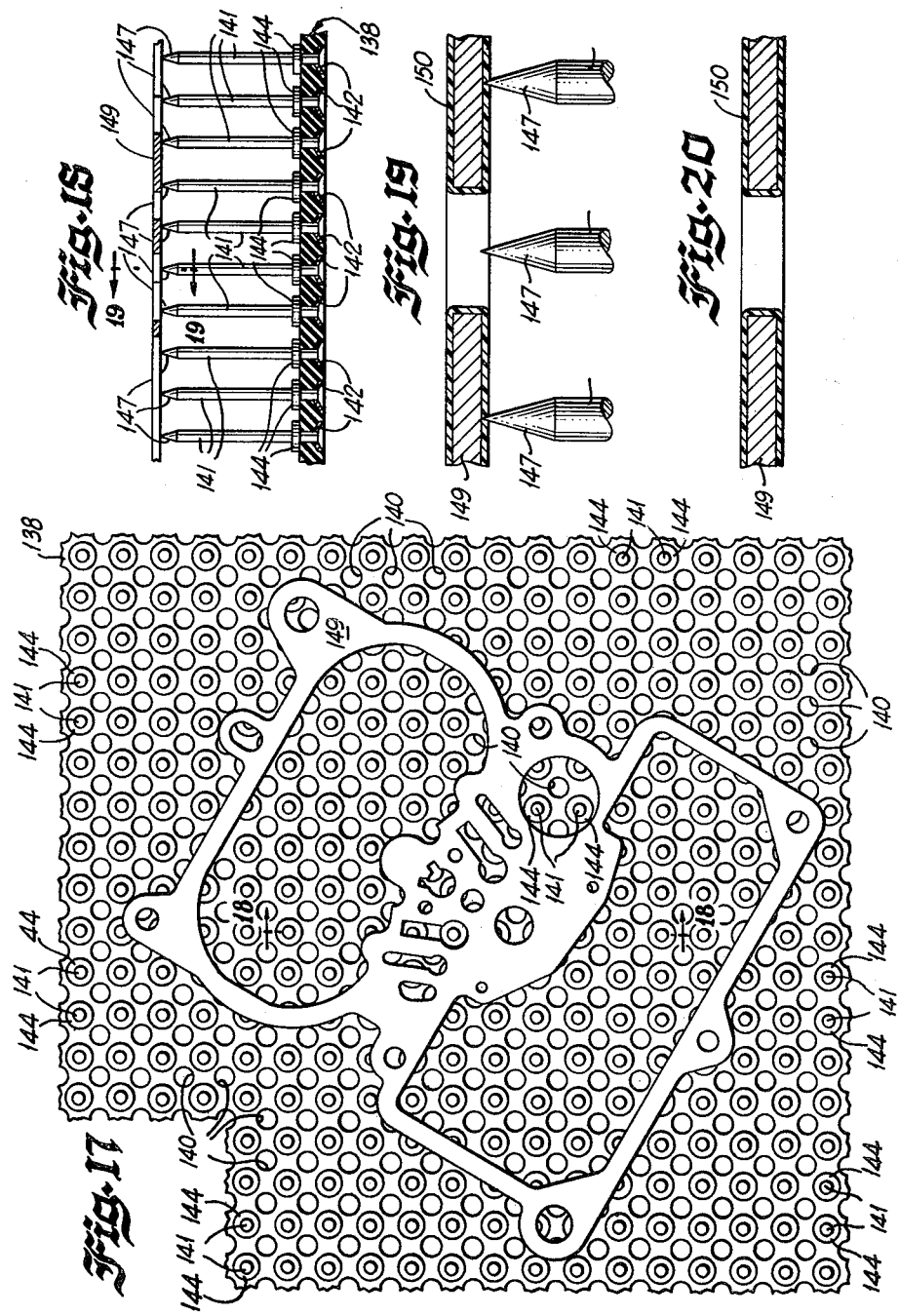

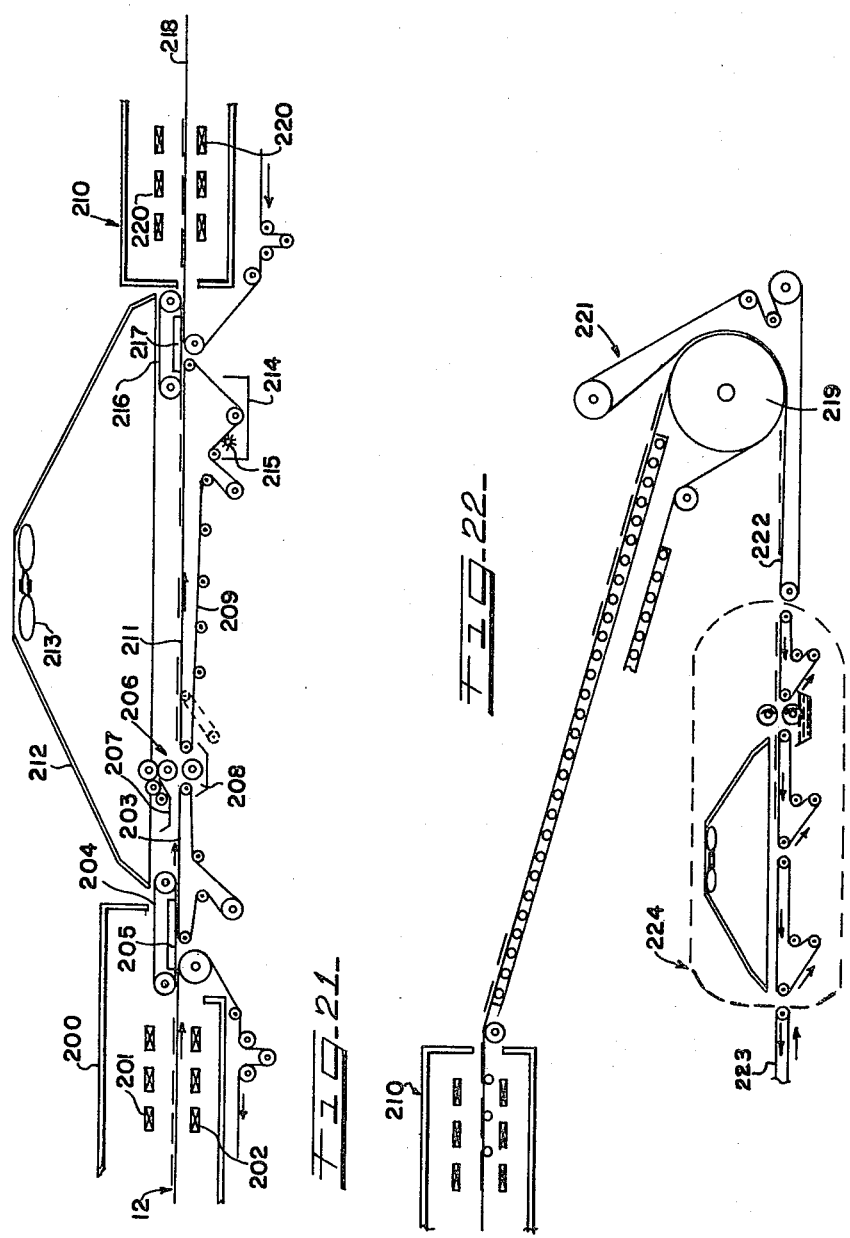

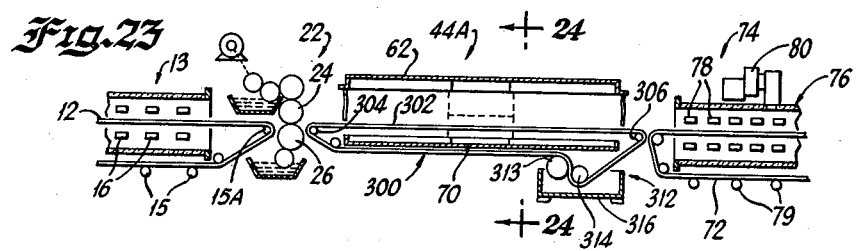
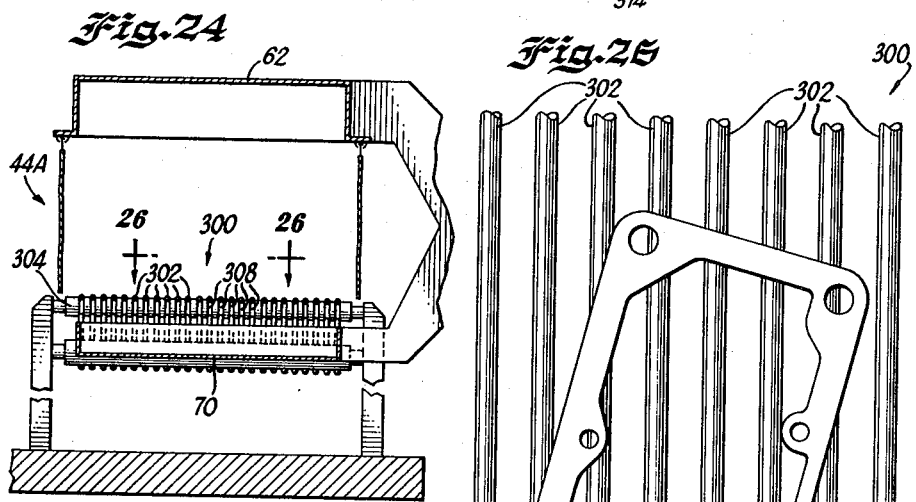
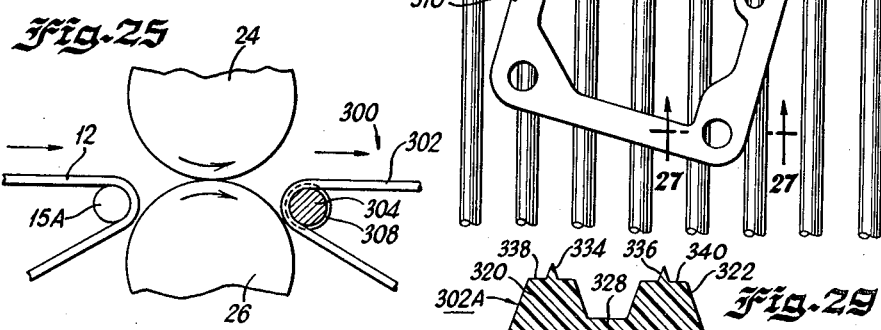
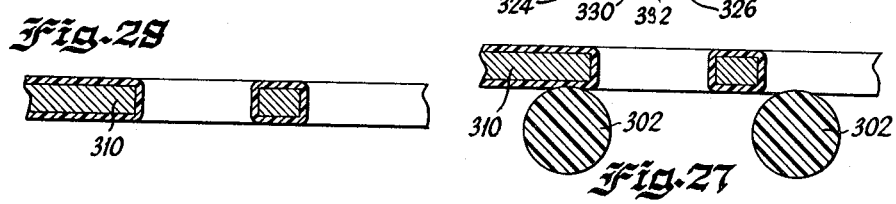

APPARATUS FOR COATING LIQUID PENETRABLE ARTICLES WITH POLYMERIC DISPERSIONS

CROSS REFERENCE TO RELATED APPLICATIONS

This application is a continuation-in-part of applicant's prior application Ser. No. 014,991 filed Feb. 26, 1979, abandoned, which is a continuation-in-part of Ser. No. 933,893 filed Aug. 15, 1978, abandoned.

BACKGROUND OF THE INVENTION

1. Field of the Invention

The present invention relates to an apparatus for carrying out a method of coating fluid-penetrable articles with a polymeric disperson, preferably a water-dispersible polymeric coating. The method includes the steps of pre-heating a fluid-penetrable article, such as a compactible gasket; thereafter coating the fluid-penetrable article with a polymeric disperson; conveying the coated article through a drying station to allow the coated article to dry to a tack-free condition; and then conveying the coated article through a curing oven for curing the deposited coating material.

Many fluid-permeable compactible articles, such as gaskets, are coated with a polymeric dispersion, for example, a polymeric dispersion, such as chloroprene synthetic rubber blended with phenol formaldehyde resin or nitrile synthetic rubber blended with phenol formaldehyde resin. Articles, such as gaskets, with these type coatings, and after curing, provide fluid-impermeability during use. For example, an automotive transmission oil pan gasket requires a relatively thick uniform coating of a soft conformable material for sealing, principally due to the fact that the clamping flanges are relatively lightweight metal with rather wide spacings between the fasteners. The flanges are not only quite flexible, but in substantially all cases quite uneven. The clamp load on these type applications is very uneven—relatively high under the fasteners and relatively low between the fasteners, because the flanges bend readily between fasteners. The coating material provides the fluid barrier needed in the areas of the part that are lightly clamp loaded. The coatings selected are of course tailored to resist the environmental conditions such as the particular fluid, the temperatures, and the torque loading entailed with each application. The gasket material to be coated likewise is selected to provide the resistance to the environmental conditions in the particular application. In the case of a pan gasket, these gasket materials are commonly vegetable fibers blended with particulate, such as granulated cork and reinforced with elastomeric materials such as chloroprene rubber or nitrile rubber and in some cases SBR synthetic rubber. Frequently, mineral fibers are used—blended with vegetable fibers.

2. Prior Art

A variety of gasket materials have been coated with polymeric dispersions for many years. My prior U.S. Pat. No. 3,770,480 discloses this assignee's coating method used immediately prior to this invention for applying polymeric coatings to gasket materials. In general, a die cut gasket is coated on both major surfaces and its edges with a blend of synthetic elastomers and phenolic resin in a water or solvent dispersion. When in the form of a die cut part, the gasket includes one or more pilot holes so that it can be hung on a hook from the pilot hole for drying and then curing of the polymeric coating. In this manner the polymeric coating is not disturbed during drying or curing so that the coating material will maintain its fluid-impermeability. In this prior art method, the gaskets coated with a wet, tacky polymer are manually hung onto hooks from the pilot holes and are sent on a long, continuous path by a chain conveyor to provide sufficient time for the applied coating to be partially dryed prior to curing. The polymeric coating on the hung gaskets is dryed while the gaskets are hanging from the pilot hole until the polymeric coating is substantially tack-free. The dryed, coated gaskets are then conveyed through a curing station, while hung from the pilot holes and, since the major coated surfaces of the gaskets do not contact the conveyor, the impermeability of the coating is not disturbed during drying or curing. The above-noted drying step prior to curing is required for a very important reason—to permit a major portion of the fluid from the polymeric coating, which has partially penetrated the compactible material, to escape before the coating is subjected to the relatively high temperature curing (for example 325°-375° F.). The curing gasifies the fluid (for example water) during the curing step and, at the same time, seals the polymeric surface to render the coating impermeable. Any significant amount of fluid that has not escaped during the drying step becomes locked into the part, and will cause the polymeric coating to blister or 'balloon' outwards.

Drying by the above-described hook-hanging method is quite slow and requires very careful monitoring of the room or chamber conditions, particularly temperature and humidity, where the drying is accomplished. The drying operation can be speeded up using higher temperature upwards to approximately 110°-130° F. but has to be very carefully controlled to be sure that the surface of the coating does not seal or "skin over" by premature curing to lock in fluid from the polymeric coating and thereby slow down the drying step rather than speed it up. Accordingly, drying must be carried out slowly at a temperature well below the curing temperature of the polymeric coating, generally room temperature. In actual practice, air drying at room temperatures in the range of 65°-100° F., which requires a range of 20-80 minutes, has been found to be safest and is typical for the above-described hook hanging drying procedure. Drying these type of coatings sometimes has to be stopped when the room humidity becomes too high until there is a weather change. Three or four warm days with, for example, 85° F. with 90% humidity, will cause a shutdown of the drying operation handling the above-described coated gasket materials.

The time and temperatures required for drying by the hook-hanging method are affected by the particular porosity of the many varieties of compactible gasket materials used. A gasket material will pick-up or absorb fluid from the applied polymeric coating in proportion to its porosity. It has been necessary to subject coated, die-cut gaskets to a substantial air-dry period in the range of about 20-80 minutes at 65°-100° F., after coating and before curing, to make sure that the water picked up by the gasket material from the polymeric coating has been driven off before the coating "skins over" on the surface. The coating materials are designed to be fluid-impermeable and if these coatings "skin over" or surface dry before the gasket-obtained water migrates out from the gasket sheet and through the polymeric coating, the retained water or solvent(s) will vaporize at the high temperatures in the curing stage causing blistering of the gasket.

Considerable skill has been developed in the air-drying/hook-hanging method so that blistering can be controlled by assuring that the hook-hung gaskets travel through a lengthy air drying path. Depending on the temperature and humidity conditions in the room in which the hook-hung parts are dried, sometimes warm, dry air is circulated to reduce the time necessary to drive off the water picked up by the gasket material. This air circulation technique must be controlled very carefully, however, since the coating material can be caused to "skin over" too quickly before the moisture from the gasket material has migrated out from the sheet as described above. In any event, each part must be individually hung on hooks of the conveyor while the conveyor moves through a large room at a temperature of 65°–100° F. and at varying relative humidity during the year.

In my prior U.S. Pat. No. 3,986,915, there is disclosed a method of fabricating a valve plate for transmissions including a metal core having a gasket material adhered to one or both core surfaces. The gasket material can be a polymeric material and the metal core can be preheated for cover sheet adherence and to reduce subsequent curing time of the adhesive. The gasket material, however, is applied to the metal core as solid sheet material in U.S. Pat. No. 3,986,915 and, since the metal core material is fluid-impermeable, fluid penetration into the core material is not a problem.

As set forth in my U.S. Pat. No. 3,926,445, prior techniques for coating gasket materials with liquid dispersions of polymers include coating one side of the gasket material with a very thin coating of the polymeric dispersion so that the coating material can dry readily. The thin coating technique sometimes requires several coating applications. The present invention relates to a method of applying a liquid dispersion of a polymer to a fluid-permeable core material in such a manner that the fluid-permeable core material is not substantially permeated with liquid from the applied coating. In this manner, the coating can be applied uniformly in any desired thickness while achieving rapid drying of the polymeric coating without causing coating surface defects.

In the parent application hereinabove identified, of which the present is a continuation-in-part, a number of prior art patents have been cited, the most important of which is the British patent to Parsch No. 1,017,484, published on Jan. 19, 1966. The disclosure of this patent, however, is entirely foreign to the problem being solved in the present application; primarily because of the fact that Parsch is dealing with a woven hose with the hose being passed through a bath of natural or artifical rubber in a solvent system with the intention and desire that the coating material penetrate into the woven fabric in order to provide a depth of coating material on the hose, and the only relevance of the patent to the present disclosure is that a heated media is provided within the hose to encourage drying the coating in an outwardly direction. There is no suggestion of how the Parsch concepts could be applied to flat articles in a continuous system, nor is there any suggestion of a coating system using a water dispersion system which prevents penetration of the coating rather than encouraging penetration.

SUMMARY OF THE INVENTION

In accordance with an important and surprising feature, the apparatus of the present invention provides a means of preheating gasket material to a temperature of at least about 130° F., and preferably in the range of 150°–250° F., prior to applying a liquid dispersed polymeric coating, thereby reducing to a total of 10–40 seconds the time required for the coated gasket to dry to a tack-free condition, as compared with the prior art time of 20–80 minutes. Additionally, the apparatus of the present invention completely eliminates the above-described problems of production interruptions and gasket blistering which occur with the prior art air drying/hook-hanging process. Accordingly, it is an object of the present invention to provide an apparatus for making fluid-impermeable gaskets which permits a fluid-permeable gasket material to be heated to a temperature of at least 130° F. prior to coating the gasket material with a water or other liquid dispersion of a fluid-impermeable polymeric coating.

Another object of the present invention, is to provide an apparatus for transporting gasket materials and the like, which have a wet coating of a polymeric dispersion, through a drying station in a manner which minimizes the disturbance to the wet coating and maintains the impermeable nature of the polymeric coating.

Another object of the present invention, is to provide an apparatus for making fluid-impermeable gaskets wherein a fluid-penetrable gasket material, before coating, is heated to a temperature sufficient to prevent any substantial penetration of liquid into the gasket material when the gasket material, at the preheated temperature, is contacted with a liquid dispersion of polymer.

Another object of the present invention is to provide an apparatus for coating gasket materials including means for heating gasket material to a temperature sufficient to prevent any substantial penetration of liquid into the gasket material when contacted with a liquid dispersion of polymer and maintaining the gasket material at or above such temperature until the gasket material is dried to a tack-free condition.

Another object of the present invention is to provide an apparatus for conveying gasket material, freshly coated with a liquid dispersed polymer, through a drying station by conveying the coated gasket while suspended on a plurality of raised portions of a non-flat conveyor so that the polymeric coating is contacted by the conveyor in only a small area (generally 30% or less of the lower major surface area of the gasket) during drying of the coating to a tack-free condition.

Another object of the present invention is to provide an apparatus for conveying a gasket, having a liquid dispersed polymeric coating, on a conveyor having a network of raised portions while the major surfaces of the coated gasket lie in a substantially horizontal plane so that after drying, any marks or indentations imparted to the polymeric coating by the plurality of conveying raised portions, will "heal over" during curing to provide a fluid-impermeable gasket.

Another object of the invention is to provide an apparatus for accomplishing the above objects which is capable of handling gaskets of various sizes and shapes.

BRIEF DESCRIPTION OF THE DRAWINGS

FIG. 1 is a cut-away, partially broken away side view of the apparatus constructed in accordance with the principles of the present invention;

FIG. 2 is an enlarged, elevated, cut-away view of a preheating station, constructed in accordance with the principles of the present invention, taken along the line 2—2 of FIG. 1;

FIG. 3 is an enlarged, cross-sectional view of a "demilking" or drying section constructed in accordance with the principles of the present invention, taken along the line 3—3 of FIG. 1;

FIG. 4 is an enlarged, elevated side view of a portion of the coating station of FIG. 1 showing the close proximity of conveyor belts of the preheating and drying sections to the coating nip, for the purpose of conveying and coating parts of varying size;

FIG. 5 is an enlarged, partially cut-away top view showing a gasket being carried on a wire cloth belt forming the drying section conveyor belt of the apparatus of the present invention, taken along the line 5—5 of FIG. 3;

FIG. 6 is a fragmentary, cross-sectional view of a coated gasket being carried by the wire cloth conveyor of the drying section of the apparatus of the present invention, taken along the line 6—6 of FIG. 5;

FIG. 7 is an enlarged fragmentary, cross-sectional view of a coated gasket being carried by the wire cloth conveyor belt of the drying section of the apparatus of the present invention showing the wire cloth slightly penetrating the wet polymeric coating;

FIG. 8 is an enlarged fragmentary, cross-sectional view of a completed encapsulated gasket (coated on all sides and edges) manufactured in accordance with the principles of the present invention using the wire cloth conveyor belt shown in FIGS. 5-7, illustrating that any marks or indentations imparted to the coating by the conveyor belt in the drying section of the apparatus have healed over during curing:

FIG. 9 is a partially cut-away top view of another embodiment of the apparatus of the present invention showing a gasket being carried on a dimpled angle bar forming the conveyor belt of the drying section of the present invention;

FIG. 10 is a fragmentary, cross-sectional view of a coated gasket being carried by the dimpled angle bar conveyor belt of the drying section of the apparatus of the present invention, taken along the line 10-10 of FIG. 9;

FIG. 11 is an enlarged fragmentary, cross-sectional view of a coated gasket being carried by the dimpled angle bar conveyor belt of the drying section of the apparatus of the present invention showing the dimples of the angle bar slightly penetrating the wet polymeric coating;

FIG. 12 is an enlarged fragmentary cross-sectional view of a completed encapsulated gasket (coated on all sides and edges), manufactured in accordance with the principles of the present invention, illustrating that any marks or indentations imparted to the coating by the angle bar conveyor belt in the drying section of the apparatus have healed over during curing;

FIG. 13 is a partially cut-away top view of another embodiment of the apparatus of the present invention showing a gasket being carried on a conveyor belt formed by rigid strips of pointed projections (needles) located in the drying section of the apparatus of the present invention;

FIG. 14 is a fragmentary, cross-sectional view of a coated gasket being carried by the needle strips shown in FIG. 13, taken along the line 14—14 of FIG. 13;

FIG. 15 is an enlarged fragmentary, cross-sectional view of a coated gasket being carried by the needle strips shown in FIGS. 13 and 14 showing the conically pointed needles of the conveyor strips slightly penetrating the wet polymeric coating;

FIG. 16 is an enlarged fragmentary cross-sectional view of a completed encapsulated gasket (coated on all sides and edges), manufactured in accordance with the principles of the present invention using the needle strips shown in FIGS. 13-15, illustrating that any marks or indentations imparted to the coating by the conveyor belt in the drying section of the apparatus have healed over during curing;

FIG. 17 is a partially cut-away top view of another embodiment of the apparatus of the present invention showing a gasket being carried on a needle belt conveyor of the drying section of the apparatus of the present invention;

FIG. 18 is a fragmentary, cross-sectional view of a coated gasket being carried by the needle belt conveyor shown in FIG. 17, taken along the line 18—18 of FIG. 17;

FIG. 19 is an enlarged fragmentary, cross-sectional view of a coated gasket being carried by the needle belt conveyor shown in FIGS. 17 and 18 showing the conically pointed needles slightly penetrating the wet plymeric coating;

FIG. 20 is an enlarged fragmentary cross-sectional view of a completed encapsulated gasket (coated on all sides and edges), manufactured in accordance with the principles of the present invention using the needle belt conveyor shown in FIGS. 17-19, illustrating that any marks or indentations imparted to the coating by the conveyor belt in the drying section of the apparatus have healed over during curing;

FIG. 21 is a schematic diagram showing a slightly modified form of the invention;

FIG. 22 is a schematic diagram showing the manner in which the coated and cured gaskets may be delivered to a release coating device and then conveyed by suitable means to an inspection, packaging and shipping area.

FIG. 23 is a cut away side view of the apparatus constructed in accordance with the present invention showing a continuous, elastomeric cord belt conveyor in the drying section;

FIG. 24 is an enlarged, cross-sectional view of a "demilking" or drying section constructed in accordance with the principles of the present invention having an elastomeric cord continuous conveyor belt;

FIG. 25 is an enlarged, elevated side view of a portion of the coating station of FIG. 23 showing the close proximity of the preheating section and drying section (having a continuous elastomeric cord conveyor belt) to the coating nip;

FIG. 26 is an enlarged, partially cut away top view showing a gasket being carried on a continuous, elastomeric cord conveyor belt forming the drying section conveyor belt of the apparatus of the present invention, taken along the line 26—26 of FIG. 24;

FIG. 27 is an enlarged fragmentary, cross-sectional view of a coated gasket being carried by the elastomeric cord conveyor belt of the drying section of the apparatus of FIG. 23 showing the elastomeric cord slightly penetrating the wet polymeric coating;

FIG. 28 is an enlarged fragmentary, cross-sectional view of a completed encapsulated gasket (coated on all sides and edges) manufactured in accordance with the principles of the present invention using the elastomeric cord conveyor belt shown in FIGS. 23-26, illustrating that any marks or indentations imparted to the coating by the conveyor belt in the drying section of the apparatus have healed over during curing.

FIG. 29 is an enlarged cross sectional view of a particular shape of a cord belt for the drying station conveyor in accordance with the present invention.

DETAILED DESCRIPTION OF THE INVENTION

In general, most gasket materials can be coated with polymeric dispersions using the apparatus of the present invention. Exceptions would be materials that are, for example, "waxy" or "slippery" so as to resist adhesion of the coating material to the gasket material. Examples of "waxy" or "slippery" substances are most of the TEFLON materials—or materials that have been precoated with certain types of anti-stick or release materials. The fluid-penetrable gasket materials may take a variety of configurations and compositions. This variety spans a very wide range—including, for example, organic and inorganic fibers such as wood, cotton, sisal, jute, asbestos, and glass, in various thicknesses, densities and incorporating various fiber preparations, for example, fine, coarse, short, long, rough, and the like. There is also a wide variety of available gasket stock materials, as, for example, those disclosed in the U.S. Pat. to Kao Nos. 2,676,099; 2,884,060 and 3,082,145.

For the most part, this invention is primarily applicable to the coating of finished gaskets, i.e., gaskets which, except for the application of the seal coating, and in some cases, a release coating, are complete in and of themselves. There are exceptions, of course, as when the part to be coated is purely a cover sheet for a cored gasket as shown, for example, in Farnam U.S. Pat. No. 3,796,623. Of course, the invention is not limited to layer gaskets, and may be used with many forms of laminated gaskets.

Cutting a gasket into a particular required shape creates a considerable percentage of waste gasket material since, in most cases, gaskets encircle one or more openings or holes. Wasted gasket material, for this applicant, for example, ranges from about 20 to about 80% with an average of about 50 to 70% even though small gaskets are made from cut-out or waste portions from larger gaskets whenever possible. Accordingly, it is very important in the art of gasket manufacture to provide a process whereby gaskets can be shaped or cut from relatively inexpensive gasket sheet materials and, after shaping, the gaskets can be coated with one or more polymers to provide the properties of proper sealing and gas-impermeability.

In accordance with an important feature of the present invention, the apparatus of the invention allows the sealing capability of gasket material to be improved by concentrating substantially all of the polymers necessary for surface sealing sensitivity at the gasket surfaces, where needed, by coating the gasket material with a liquid dispersion of polymer after shaping the gasket, as by die-cutting. Accordingly, the more expensive gasket sheet materials having a substantial percentage of elastomer blended with the fibers during manufacture are unnecessary by utilizing the principles of the present invention. The cost savings are two-fold—elastomer is not wasted throughout the body or core of the gasket material; and elastomer is not wasted in material which is cut away when the gasket is shaped. It has been recognized that coating would provide this two-fold cost savings but in the past the coating steps necessary were about as costly as the more expensive sheet materials, as above-described with reference to the prior art hook-hanging procedure. Now, for the first time, substantial cost savings can be realized by utilizing less expensive gasket sheet materials in that the materials can be economically and effectively coated with one or more polymers after shaping.

Another important advantage to providing gaskets made from sheet materials having a relatively small percentage of elastomers in the core material is that such materials have better stress relaxation properties. Gaskets having a smaller percentage of elastomer in the core material have significantly increased torque retention to hold clamped flanges together and thereby maintain a better seal.

The polymeric coating used in fabricating the gaskets of the present invention may be tailored for firmness or softness and should have a high degree of fluid-resistance so that after total curing or setting up, the coating is capable of forming a substantially fluid-impermeable or impervious barrier on at least one or both major surfaces of the gasket.

In general, the coatings fall into two general categories, namely, seal coatings or adhesive coatings. The two coating families generally are compounds of chloroprene rubber blended with phenolic resin, or nitrile rubber blended with phenolic resin. Each coating (sealing or adhesive) is specifically compounded to do a particular type of adhesive bonding or sealing. Particular polymers found satisfactory include those which are thermosetting at a temperature in the range of about 325° to 400° F. In a preferred embodiment of the present invention, the polymeric coating is applied to the core of gasket material as a water dispersion. Preferably the coating is a composition of one or more heat reactive resins modified with synthetic elastomer latex. Satisfactory polymers include blends of synthetic elastomers such as neoprene and nitrile rubber with synthetic resins such as phenolic resins with appropriate curing agents. Other polymeric coating materials, resins and elastomers may be used, such as those disclosed in U.S. Pat. No. 3,158,526 to Farnam et al. The particular polymers may be varied to accentuate any desired characteristics.

The adhesive coatings, of which there are two general types, are applied to the top and bottom surfaces of a gasket part that is to be hot press laminated in a separate operation, or is applied to parts which when clamped between flanges, stick to one of the flanges. These two types of adhesive coatings are only dried on the apparatus hereinafter described, but are not cured in such apparatus.

The seal coatings are applied to one or both surfaces of parts, or applied to one or both surfaces and to all edges, in which latter case the part is said to be encapsulated. The seal coatings are dried and cured on the apparatus hereinafter described.

When a phenolic-resin/elastomer type polymer is used, it will be found that when the coating is cured after drying, the resin actually softens or melts materially in its combination process with the synthetic rubber to provide a fluid-impermeable coating. Depending upon the material, type of clamping flanges, finish, temperatures, fluid to be sealed, and the like, some materials under certain conditions tend to stick to the clamping flanges when they are disassembled. Broadly speaking, experience indicates that sticking may be of a "mechanical nature". For example, the gasket surface material might extrude into the pores of slightly porous clamp flange surfaces to hook or lock the gasket in place. On the other hand, gasket sticking might be chemical in nature or a combination of chemical and mechanical locking, frequently difficult to predict until after a particular material has been tried or tested. Therefore, when these types of conditions occur, release coatings are applied to the gasket material to eliminate the sticking problem and, at times, release compounds can be incorporated in the gasket material or coating material. The release coatings on the gasket material or coated gasket should have the required resistance to the total environmental conditions under which the part is to be used.

The apparatus of the invention is adaptable to provide polymeric coatings having desired thicknesses as may be necessary for ultimate end uses. Generally, the thickness of the polymeric coating applied to the surface of the article to be coated, for example a gasket, will be in the range of about 0.0005 to 0.005 inch. The preferred thickness is in the range of about 0.001 to 0.002 inch.

The coatings which are used are compounded for very high fuel, oil, and water resistance properties, and particularly, so that they are impermeable to these materials in very thin film form, as for example, in the range of 0.001 to 0.002 inch thickness. It is recognized that if the film thickness is too great, as for example, in excess of 0.005 inches and sometimes in excess of 0.002 inches, the gasket part will exhibit serious structural problems such as excessive crushing, distortion, extrusion, and torque loss. The thin rubbery, impermeable film increases the surfaces conformation of the clamped gasket to greatly improve surface seal while the encapsulation of the gasket part prevents penetration of liquids as well as gases through the body of the gasket.

It should be noted that there is always a tendency in applying coatings to a gasket part for the edges to acquire a somewhat greater thickness than the top and bottom surfaces, particularly with roll coating as hereinafter described. In such a case allowances are made in the sizing of holes in the gasket part for this additional edge coating thickness which may range from 0.0025 inch to 0.0035 inch in thickness, but which additional thickness does not have any particularly deleterious effect upon gasket functioning.

It is an important feature of the present invention to provide an apparatus for applying polymeric coatings to fluid-penetrable articles in a more uniform thickness than apparatus of the prior art. The apparatus of the present invention permits the gasket material to lie in a substantially horizontal plane while in the drying or "de-milking" station until the polymeric coating is substantially tack-free. The effect of gravity will, therefore, not cause the wet polymeric coating to accumulate more in any particular area of a major gasket surface, as might occur during the lengthy drying path of the above-described prior art hook-hanging method. Further, it has been found that pre-heating the gasket material prior to coating enables the fluid dispersed polymeric coatings to dry almost instantaneously so that the wet polymeric coating will not have sufficient time to penetrate the gasket surface as the coated gasket is supported on the drying station conveyor belt. The capability of providing a uniform thickness of polymer on the major gasket surfaces is very important to assure adequate sealing between flange bolts, as set forth above.

Where die cut parts are coated, depending upon the particular material and thickness, the coatings generally will have a tendency to build up thicker at the cut edges than on the major surfaces of the part. This tendency is actually an advantage since the additional polymer thickness on the edges is desirable for sealing purposes. The die cutting process easily can be modified to allow for the extra coating thickness on the edges. It is important to recognize the fact that many gaskets, particularly at the cut edges, are not as uniform and smooth as, for example, sheet steel used to produce tin cans, which are frequently coated. It is therefore important to select and tailor the coatings to flow so that the coating is not too thick or viscous and at the same time maintain sufficient viscosity to provide the minimum coating thickness for an effective seal under particular conditions.

It is another important feature of the present invention to provide an apparatus capable of coating a variety of fluid-penetrable articles having very distinct differences in size and shape. The assignee of this application presently produces several thousand different shapes and sizes of fluid-penetrable articles capable of being coated with a fluid dispersed polymer in accordance with the principles of the present invention. The apparatus herein described can be used to coat most, if not all, of these several thousand parts, without modification, from the smallest, to parts as wide as the conveyor belts.

Accordingly, the specific configuration of the gaskets coated in accordance with the apparatus of the present invention may be many. Automatic transmission pan gaskets, automotive water pump gaskets, carburetor airhorn to bowl gaskets, and similar gaskets, made in accordance with the teachings of this invention, have been found to work especially well.

In accordance with a specific embodiment of the present invention, the apparatus is used to deposit a liquid polymeric dispersion onto gasket material in a continuous layer or state to provide a completely coated gasket on both major surfaces and all edges having the desired characteristics of fluid-impermeability, conformability, and sealability tailored to meet a variety of end uses.

DETAILED DESCRIPTION OF THE PREFERRED EMBODIMENTS

Referring now to FIG. 1, there is generally illustrated apparatus for preheating and conveying a gasket part, coating the gasket with a fluid dispersed polymer, and drying and then curing the coating in accordance with the present invention. Preferably, the gasket material (i.e. FIG. 5) first is cut to its final configuration, as by die cutting, and then placed on a conveyor belt 12 for conveyance into and through a preheating station, generally designated by reference numeral 13. Preheating station 13 includes a preheating oven generally designated by reference numeral 14. The conveyor belt 12 is maintained in a predetermined path through preheating station 13 by guide rollers 15 and 15A.

It is an important feature of the present invention that the apparatus permits the gasket material to be preheated to a temperature sufficient to prevent any substantial penetration of liquid into the gasket material and maintained at or above such temperature until the gasket is coated with a water or solvent dispersion of a fluid-impermeable polymer.

It has been found that a preheating station temperature of at least 130° F. will prevent substantially all of the polymeric dispersion from penetrating into the gasket material and simultaneously force the solvent or water in the coating outwards through the coating and dry the coating from the inside out to prevent blistering. The preheating not only speeds up the drying process, but also prevents the coating from bubbling and blistering as often occurs in coating materials when dryed only from the outside. It is important to recognize, as earlier stated, that these type coatings which are designed to become sealants rapidly are closing up on the outer surface, or "skin over" during the drying process to create a fluid blockage preventing further fluid escape from the gasket and polymeric coating.

It is understood that materials to be coated, such as gaskets, vary over a tremendous range in properties such as density, structure, thickness, porosity specific heat and other physical characteristics. Recognizing this wide variety of materials, it may be possible to use a preheating temperature as slow as approximately 130° F. with some materials, coatings, and coating thicknesses, but obviously, the lower the temperature and the closer to room temperature, the greater the likelihood of blisters and the more unreliable and inconsistent the process. Temperatures in the range of 130°-150° F. can be tested easily to determine if such low temperatures will be effective in coating a particular gasket material with a particular coating in a given thickness by conveying one or two trial parts through the apparatus of the present invention with the preheating station 13 operating at various temperatures. In this manner, the lowest temperature at which the gasket will not blister can be determined. It is noted that, in many cases, a temperature of 150° F. is sufficient for this purpose. All temperature references are to surface temperatures.

Preheating oven 14 includes a plurality of radiant heaters 16 disposed immediately above and below conveyor belt 12 so that the gasket material is heated completely throughout its thickness during its passage through preheating oven 14. An exhaust fan 18 is attached to preheating oven 14 for removal of the gases formed in the oven 14. More particularly, the exhaust fan 18 removes a considerable portion, and in some cases substantially all, of the residual water content of the gasket material which the gasket material may have picked up during storage as a result of ambient humidity and/or the moisture content that exists in almost all compactible materials. In the preheating oven 14, the gasket material is heated and dried to, in most cases, substantially bone dry condition and is heated to a temperature of at least about 130° F., preferably in the range of about 160° to 200° F. The gasket material should ordinarily not be excessively preheated to a temperature which would cause the polymeric dispersion coating to boil (bubble) when applied.

The gasket material leaves the preheating oven 14 and is directed into a coating station, designated generally by reference number 22. The coating station 22 generally comprises a pair of absorbent mop-type rollers 24 and 26 disposed such that upper roller 24 contacts lower roller 26.

In the preferred embodiment shown in FIGS. 1-8, both upper and lower mop rollers 24 and 26 receive a liquid dispersed polymeric coating to fully encapsulate the preheated gasket on all sides and edges. In this manner the finished gasket will be completely fluid-impermeable. Lower mop roller 26 receives the polymeric coating by contacting lower coating transfer roll 28 partially submersed within a lower surface coating material 30 held within reservoir 32. Upper mop roller 24 receives the polymeric coating by contacting upper coating transfer rolls 34 and 36. Transfer roll 36 is partially submersed with an upper surface coating material 38 in reservoir 39 to transfer the upper surface coating 38 to roller 34 for transfer of the coating material 38 to upper mop roller 24. The upper transfer rollers and upper mop roller are driven by drive roller 40 operatively connected to motor 42. Rotation of upper mop roller 24 drives lower mop roller 26 causing further pick-up and transfer of the lower coating material 30 from reservoir 32. The coating method may vary widely, and any of the well known coating methods are useful in accordance with the principles of the present invention to apply a coating of a liquid-dispersed polymer over the gasket. The coating materials 30 and 38 can be the same or different and can be applied in the same or different amounts to the top and bottom surfaces.

Other coating techniques, such as spraying, dipping, and the like, also can be used to apply the polymeric coatings 30 and 38 to the preheated gasket material.

In the case of spray coating, flat streams of coating material may be directed over the top and bottom surfaces of the gasket as it passes through the coating station with the flat stream being formed by elongated slits in pipes placed above and below the pre-heated gaskets and with the coating fluid pumped into these pipes (not shown). The pipes are placed normal to the direction of the conveyor movement and the advantage of applying coating material in this manner is to obtain better coverage of the gasket edges, both external edges and those defining the interior walls of openings, which in many instances are small holes within the gasket.

In the case of dip coating, it is important that the gasket be transported by suitable conveyor means through an immersion tank containing the coating material but at substantially the same speed as the conveyor speed which may be on the order of thirty to fifty feet per minute. The transport conveyor through the immersion tank is such that the gasket part is completely immersed for not more than about two or two and one-half seconds, and preferably more on the order of one or one and one-half seconds.

By using the dip method of coating, or the spray coating method, as distinguished from coating, there is greater assurance of complete coverage of all outside and inside edges of the gasket being coated. Regardless of the coating method, it is important that the length of the dwell of the part in the coating head is not excessive, i.e., not more than a very few seconds because if the dwell is too long the residual heat in the pre-heated gasket part will be dissipated and the water in the polymer dispersion will not be effectively driven off but instead the polymer, as it is deposited on the surface of the part will form a dam that will inhibit the release of the water from the gasket part.

It is contemplated that when dip coating or spray coating is used to insure proper coating of the edges of a part and particularly the inside edges of openings within the part that is coated, it will normally be followed with roll coating of the top and bottom surfaces of the part to control and limit the thickness of these coatings, although in some instances this may be unnecessary. Also, it is contemplated that the dip coating and spray coating heads will be in tandom with the roll coating heads and may be deactivated as required so that only roll coating is used on certain gasket parts.

In speaking of spray coating, it should be understood that the term is used in a broad sense and is intended to include what might be called "shower" coating, i.e., a coating in which a planar film of coating is directed upon the top and/or bottom surface of the gasket part.

The coating material applied at coating station 22 is supplied in substantially equal thicknesses on the top and bottom major surfaces of the gaskets, on the outside edges of the gasket as well as the inside edges surrounding internal apertures and bolt holes. The rollers 24 and 26 preferably are mop-type rollers having deep piles as generally known in the art of gasket coating. The gaskets are fed into the nip of the rollers 24 and 26 for coating, and a support table (not shown) can be disposed between the preheating station 13 and coating station 22 for accurate feeding of the gaskets into the nip of rollers 24 and 26. The polymeric dispersion coating can be applied by any other known method of coating sheet material. The coating can be applied as thick or as thin as desired for any particular intended use on one or both major surfaces.

In accordance with an important feature of the present invention it has been found that gaskets pre-heated to a temperature of at least about 130°–150° F. will prevent substantially all of the water or other solvents contained in the polymeric dispersion from permeating the material being coated. The heat contained in the preheated gaskets provides a substantial driving force for causing rapid migration of the water or solvent away from the gasket and through the polymeric coating. In this manner, the gasket can be dried to a tack-free condition in a period of less than about one minute, and ordinarily, in a period of time within the range of about 20–40 seconds. This result is most surprising since, in the prior art method of hook-hanging gaskets for air drying, it has required 20–80 minutes, or in some cases, even twice that long, for sufficient water or solvent removal before the polymeric coating could be cured without gasket blistering. The preheating temperature sould be sufficient to vaporize the solvent or dispersant (carrier) in the subsequently applied polymeric coating composition. Accordingly, preheating is generally sufficient in the range of 130°–250° F.

In speaking of temperatures at which the gaskets are preheated before the application of coating material, one must recognize that it is very difficult to ascribe specific temperatures to the gaskets after passing through the pre-heat oven. The gaskets that are processed are of various sizes, shapes, thicknesses, and materials and consequently have different specific heats so that for these different gaskets there will be in most instances a gradient of temperature from the top to the bottom of the gasket.

It has therefore been found expedient from a practical standpoint to use empirical means for determining the proper temperature at which a given gasket should enter the coating rolls or coating device, and it has been found from experience that with the coating material maintained at as near room temperature as possible by suitable means, a gasket part should be preheated within the stated range that will enable it to go through the coating stage without causing coagulation, blistering or curdling of the coating material during the application, which does occur if the temperature is excessive but yet high enough so that when the part reaches the curing oven, the preheating has effectively prevented penetration of water into the gasket part so that the coating does not blister as it enters the curing oven. These two parameters have been found effective from a practical standpoint in determining proper preheat temperatures, conveyor speed, heat input in the preheat stage, etc. and to enable one skilled in the art to find the proper preheat temperature for effective coating of gaskets of different materials, sizes, shapes, and thicknesses.

As a practical matter, a conveyor speed is selected as, for example, thirty-five feet per minute for a given part that is being coated, and the preheat temperature is adjusted up or down as required so that the part as it enters the curing oven does not exhibit blistering. The preheat temperature should be adjusted as high as possible within the stated range to (a) just avoid blistering in the cure oven and (b) not cause coagulation or curdling of the coating material as it is applied to the part. Of course, in addition to adjusting preheat temperature, conveyor speed and the quantum of air circulation over the demilking area following coating may be adjusted as well. All of these adjustments can be made easily within the space of from one to four minutes.

In accordance with another important feature of the present invention, the preheated gasket material, coated in accordance with the present invention is conveyed from coating station 22 immediately to a drying or "de-milking" station designated generally by reference numeral 44. In some circumstances, however, this drying station may not be necessary. At drying station 44, the gasket material dries from the inside out to a tack-free condition as a result of being preheated while supported on a conveyor designed so that there is minimal disturbance of the impermeable quality of the polymeric coating on the surface contacting the conveyor. The drying or "de-milking" station 44 (best shown in FIG. 3) includes a wire mesh conveyor designated generally by reference numeral 46.

Wire mesh conveyor 46 includes a conveyor belt 48 comprising a reticulated wire mesh, as best shown in FIGS. 5–7, having a plurality of spaced apart raised portions 50, for supporting the coated gasket material. The particular wire mesh 50 illustrated in FIGS. 5–7 is a galvanized balanced weave belt made by Ashworth Corporation, has a weight of 1.5 pounds per square foot, has a wire diameter of 0.062 inch, has openings of approximately 0.27 inch × 0.31 inch, and has a cross-sectional wire area of 0.221 inch per foot of belt width. The conveyor belt 48 is maintained in a predetermined path within drying station 34 by guide rollers 52 and 52A. As best shown in FIG. 5, the wire belt 48 comprises a plurality of generally horizontally disposed, generally parallel, spaced cylindrical wires 54, having bends 56 alternating in opposite directions at regular intervals, and a plurality of angled cross woven wires 58 contacting the wires 54 at bends 56 to form approximately 90° angles between wires 54 and wires 58, tying together two adjacent generally horizontal wires 54. The wire belt 48 is capable of fully supporting a gasket in a horizontal position throughout the length of the drying station 44. The wire belt is capable of supporting articles having any desired shape or configuration in a substantially horizontal position without permanent damage to the applied polymeric coating and without the necessity for non-functional holes for hook-hanging the article. The uppermost portions 50 of cross weave wires 58 of belt 48 may impart temporary holes or depressions to the applied coating, but in the curing station the polymer surrounding the depressions is fused together to "heal-over" the coating. The preheating of the gasket 60 (FIG. 5) in preheating station 13 minimizes the temporary damage because of the surprising and almost instantaneous drying which occurs in drying station 44 as a result of the preheating.

As best shown in FIG. 4, the preheating station conveyor belt 12 and the drying station conveyor belt 48 are disposed as close as possible to coating rollers 24 and 26 to assure that small gasket parts are received between the rollers 24 and 26 and delivered to the drying station conveyor belt 48. The guide roller 15A at the coating station end of preheating station belt 12 and the guide roller 52A at the coating station end of drying station belt 48 are of small diameter, for example 1¼ inch, for conveyor belts having a 36 inch width to minimize the distance between the coating roller nip and the two adjacent conveyor belts 12 and 48.

The drying station 44 is enclosed above the conveyor belt 48 by an exhaust hood 62 including flexible walls 64 attached to the ends and sides of the exhaust hood 62 for enclosing the drying station above and below conveyor belt 48. The drying station 44 also includes an exhaust fan 66. The exhaust fan 66, in fluid communication with the enclosed portion of drying station 44, removes the gases formed in drying station 44 and particularly removes the water or solvents from the polymeric coating, so that the gaskets are in a tack-free condition when exiting drying station 44. Drying station 44 also includes a polymer collection reservoir 68, located under guide rollers 52 for catching polymeric coating drippings from conveyor belt 48. A second polymer collection reservoir 70 is disposed directly under the conveyor belt 48 to catch additional wet polymer drippings through belt 48.

The coated, tack-free gaskets are conveyed from drying station 44 by a conveyor belt 72 through a curing station designated generally by reference numeral 74. Curing station 74 includes an oven, designated generally by reference numeral 76, having a plurality of spaced radiant heaters 78 both above and below the conveyor belt 72 for curing the polymeric coating on all sides of the gasket material. Conveyor belt 72 is maintained in a predetermined path within curing station 74 by guide rollers 79. The gasket material 60 is heated in oven 76 to a temperature sufficient to cure the particular polymeric coating applied to the gasket. The curing oven 76 includes a exhaust fan 80 in fluid communication therewith for removal of gases formed within the oven 76.

The preheating oven 14 and the curing oven 76 are each constructed substantially alike. As best shown in FIG. 2, the preheating oven 14 includes insulated outer walls 82, 84, 86 and 88. Vertical frame members 90 and 92 are attached to the outer side walls 86 and 88 and serve to secure radiant heater support members 94 and 96 and a plurality of spaced conveyor belt support members 98, in position within the preheating oven 14. The completed gasket is moved from the curing station from conveyor 72 for storage and packaging. It should be noted that radiant heating is feasible with conveyor belt support for the gaskets, whereas in the prior art vertical support method, ambient air heat was required.

As shown in FIGS. 5-8 a die-cut gasket 60 is suspended or supported horizontally or flatwise on the wire belt 48 of the drying station 44, regardless of the amount of open gasket area. The upper and lower mop rollers 24 and 26 of coating station 22 fully encapsulate the gasket 60 with a polymeric coating 100 on all sides and edges as shown in FIGS. 7 and 8. Any depressions formed in the polymeric coating 100 on the undersurface of the gasket (FIG. 7) when carried through the drying station, are fused together or "healed over" in the curing oven 76, as shown in FIG. 8.

In accordance with another embodiment of the present invention, as shown in FIGS. 9-12, a different conveyor belt referred to generally by reference numeral 102 is substituted for the conveyor belt 48 in drying station 44 to support a coated gasket, such as gasket 104. This conveyor belt 102 generally comprises a plurality of dimpled angle bars 106 disposed generally parallel to one another extending longitudinally across the width of the drying station 44. The dimpled angle bars 106 generally comprise rigid support members having relatively small sheet support areas, compared to the small dimensions of the bars 106. The relatively small support area is formed by providing a central peak or apex 108 disposed longitudinally across each bar along its central axis. Spaced dimples 110 are then formed in each angle bar 106 along the longitudinal peaks 108 to provide support for the gaskets 104 as they are conveyed through the drying station 44. The included angle $\alpha$ (FIG. 10) between the legs 112 and 114 and the spacing of dimples 110 of angle bars 106 can be made as small as necessary to assure proper support for small gasket parts.

The dimpled angled bars 106 include flattened ends 115 as shown in FIG. 9 and are fastened by suitable fasteners 116 to tabs 117 attached to suitable conveyor rollers 118 hingedly connected by roller linkages 120 and fastening means 121 for travel around the guide rollers 52 and 52A. The dimples 110 can be formed by molding or expanding the angle bars 106 at appropriate locations along the apex 108. As with conveyor 48 illustrated in FIGS. 4-6 the conveyor belt 102 is flexible enough to revolve around the relatively small diameter guide roll 52A to maintain conveyor belt 102 is close proximity to the nip of coating rollers 24 and 26. The dimpled angle bar conveyor belt 102 provides horizontal support for the gaskets, such as gasket 104, regardless of the amount of open gasket area. The conveyor belt 102 has a sufficiently small contact area with gasket 104 so that any depressions formed in the polymeric coating 122 of gasket 104 (FIG. 11) during conveyance through the drying station 44 are fused together or "healed over" in the curing station 74, as shown in the completed gasket of FIG. 12.

In accordance with another embodiment of the present invention, as shown in FIGS. 13-16, another conveyor belt referred to generally by reference numeral 124 can be used in the drying station 44 for conveyance of gaskets, such as gasket 123. This conveyor belt 124 generally comprises a plurality of generally flat rigid strips or bars 126 having spaced needle point projections 128 press fitted into drilled holes in the strips 126. The needle point projections 128 have conically tapered pointed ends 130 lying in the same generally horizontal plane throughout the length of the drying station 44. The strips can be made of any suitable rigid material such as laminated sheets of phenolformaldehyde or melamine formaldehyde impregnated paper sheets (i.e. FORMICA). As a specific example, the pointed projections or needles 128 comprise cylindrical pins having tapered points 130 at their uppermost extremities for contacting the gasket material on a minimum of support area. In a specific example, the needles 128 are about one half inch long, about 0.075 inch at their widest diameter, and are spaced ⅜ inch center to center. A plurality of needle conveyor belts like 124 having various needle spacings, sizes and heights can be provided to accomodate specific part sizes and coatings. The ends of the rigid strips or bars 126 are fastened by suitable fasteners 132 to tabs 133 attached to suitable conveyor rollers 134 which are hingedly connected by roller linkages 136 and fastening means 139 for travel around the guide rollers 52 and 52A. The conveyor belt 124 is flexible enough to revolve around the relatively small diameter guide roll 52A to maintain conveyor belt 124 in close proximity to the nip of coating rollers 24 and 26. The needle conveyor belt 124 provides horizontal support for the gaskets, such as gasket 123, regardless of the amount of open gasket area. The tapered points 130 extend into the polymeric coating 140 of the bottom surface of gasket 123, as shown in FIG. 15, but any marks or indentations in the bottom surface coating disappear in the curing station 74 where the polymer surrounding the indentations fuse together or "heal over" as shown in the completed gasket of FIG. 16.

In accordance with another embodiment of the present invention, as illustrated in FIGS. 17–20, another conveyor belt, referred to generally by reference numeral 138 can be used in the drying station 44 for conveyance of gaskets, such as gasket 149. The conveyor belt 138 includes a plurality of apertures 140 disposed between adjacent rows of pointed projections 141. The apertures allow for homogeneous gas and temperature distribution throughout the enclosed portion of drying station 44 and permit wet polymer to drip through the conveyor belt 138 to avoid a build-up of polymer.

As a specific example, needles 141 comprise cylindrical stainless steel pins secured to the conveyor belt 138 by an under-belt rivet 142 and an above-belt nut 144. The conveyor belt 138 is maintained in a predetermined path within drying station 44 by guide rollers 52 and 52A. Guide discs (not shown) can be disposed between adjacent rows of needles 141 to aid in guiding the conveyor belt 138 along its predetermined path. The uppermost extremity of each needle 141 includes a conically tapered point 147 for contacting the gasket material on a minimum of support area. In a specific embodiment, the needles are about ½ inch long and about 0.075 inch in diameter; the needles are spaced ⅜ inch center to center and are capable of fully supporting a gasket in a horizontal position throughout the length of the drying station 44. A plurality of conveyor belts 138 having various needle spacings, sizes and heights can be provided to accomodate specific part sizes and coatings.

The needles of the needle conveyor are capable of supporting articles having any desired shape or configuration in a substantially horizontal position without permanent damage to the applied polymeric coating and without the necessity of non-functional holes for hook-hanging the article. A die-cut gasket 149 is supported horizontally on the pointed projections 141, regardless of the amount of open gasket area. The conically shaped points 147 of needles 141 penetrate the applied polymeric coating layer 150, while the coated gasket is conveyed through drying station 44, as shown in FIG. 19, leaving pin holes in one major surface of the coated gasket as it enters the curing station 74. The curing oven 76 causes the pin holes to "heal over" during curing of the polymeric coating 150 (as shown in FIG. 20) to maintain the fluid-impermeability of the gasket 149.

In accordance with another important embodiment of the present invention, as shown in FIGS. 23–28, the preheated gasket material, coated in accordance with the present invention is conveyed from coating station 22 immediately to a drying or "de-milking" station designated generally by reference numeral 44A having an elastomeric cord conveyor belt, generally designated by reference numeral 300. At drying station 44A, the gasket material dries from the inside out to a tack-free condition as a result of being preheated, while supported on the elastomeric cord conveyor designed so that there is minimal disturbance of the impermeable quality of the polymeric coating on the surface contacting the conveyor.

The drying or "de-milking" station 44A (best shown in FIG. 24) includes a plurality of spaced, generally parallel elastomeric cords 302, revolving continuously around grooved guide rollers 304 and 306 as best shown in FIGS. 24 and 26, having a plurality of spaced apart elastomeric cords 302 for supporting the coated gasket material. The particular elastomeric cords 302 illustrated in FIGS. 23–27 are elongated polyurethane cords having a circular cross-section about 3/16 inch in diameter, purchased in continuous spools and heat fused at the ends to provide a plurality of continuous parallel cord belts 302 spaced about ½ inch apart. The conveyor belt 300 is maintained in a predetermined path within drying station 44A by grooved guide rollers 304 and 306. The elastomeric cords 302 are maintained in a predetermined spacing by providing grooves 308 in guide rollers 304 and 306. The elastomeric cords 302 are maintained in a predetermined spacing by providing grooves 308 in guide rollers 304 and 306. The cords 302 are disposed within the grooves 308 to maintain the cords 302 substantially parallel and substantially evenly spaced. As best shown in FIG. 26, the conveyor belt 300 comprises a plurality of generally horizontally disposed, generally parallel, spaced elastomeric cords 302. To transport the coated gaskets through the drying station with a minimum of disturbance for the coating, it has been found that by vibrating the elastomeric cords 302, the cords 302 do not deeply penetrate the polymeric coating. Further, vibration of the cords 302 aids in preventing a build up of polymeric coating on the cords 302 of the conveyor belt 300 so that the conveyor requires infrequent cleaning. The cords 302 naturally vibrate by virtue of the fact that they have moving, elongated portions relatively unsupported thereunder, but additional vibration can be supplied in any known manner. The vibration can be accomplished by providing eccentric-grooved guide rollers (not shown) in place of the guide rollers 304 and 306 (FIG. 1) or by providing guide rollers 304 and 306 with spaced bumps or protrusions (not shown) along a line of contact of the cords 302 with the guide rollers 304 and 306. Another method of vibrating cords 302 would be to provide a vibrating means on one or more transverse cord-support members (not shown) disposed directly below and in contact with the travelling cords 302 between guide rollers 304 and 306. The guide rollers 304 and 306 also can be vibrated to vibrate cords 302.

To achieve the full advantage of the present invention, the elastomeric cords 302 should be made of an elastomer, which is non-adherent to the polymeric gasket coating material. It has been found that flexible polyurethane cords 302 function exceptionally well, characterized by exceptionally good surface lubricity so that the common wet, thermosetting gasket coating materials, such as the blends of neoprene and nitrile rubber with synthetic resins, such as phenolic resins, and the other coating materials disclosed in U.S. Pat.

No. 3,158,526, do not stick to the surface of cords 302. Other useful polymers for forming cords 302 having softening temperatures above the pre-heated gasket temperature include, but are not limited to the polyesters, polyolefins, polyvinylchloride; regular and block copolymers of styrene with butadiene; regular and block copolymers of styrene with isoprene; polybutadiene; ethylene-propylene copolymers; polyethylene; polypropylene; styrene-polyethylene copolymers; styrene-polypropylene copolymers; acrylonitrile-butadiene copolymers; polybutadiene; chlorinated polyethylene; polychloroprene; polyepichlorohydrin; polyfluorocarbons, such as polytetrafluoroethylene; isobutyleneisoprene copolymers; silicone polymers; polyvinylnitrile; and polyvinylacetate-ethylene copolymers. The elastomeric conveyor belt 300 is capable of fully supporting a gasket 310 in a horizontal position, as shown in FIG. 26, throughout the length of the drying station 44A. The spaced elastomeric cords 302 are capable of supporting articles having any desired shape or configuration in a substantially horizontal position without permanent damage to the applied polymeric coating and without the necessity for non-functional holes for hook-hanging the article. The uppermost portions of the elastomeric cords 302 of conveyor belt 300 may impart temporary depressions to the applied coating, as shown in FIG. 27, but in the curing station 74, the polymer surrounding the depressions is fused together to "heal-over" the coating, as shown in FIG. 28. The pre-heating of the gasket 310 in preheating station 13 minimizes the temporary damage because of the surprising and almost instantaneous drying which occurs in drying station 44A as a result of the preheating.

As best shown in FIG. 25, the preheating station conveyor belt 12 and the drying station conveyor belt 300 are disposed as close as possible to coating rollers 24 and 26 to assure that small gasket parts are received between the rollers 24 and 25 and delivered to the drying station conveyor belt 300. The guide roller 15A at the coating station end of preheating station belt 12 and the guide roller 304 at the coating station end of drying station belt 300 are of small diameter, for example 1¼ inch, for conveyor belts having a 36 inch width to minimize the distance between the coating rollers nip and the two adjacent conveyor belts 12 and 300.

The drying station 44A includes a wash station, generally designated 312 having conveyor guide rollers 313 and 314 at least partially disposed within a solvent wash basin 314 for cleaning each of the cords 302. It has been found that the waxy surface of the spaced cords 302 do not collect much of the resin coating so that drying station conveyor cleaning does not present a significant problem when the drying station conveyor 300 is made from elastomeric cords, as described.

The elastomeric cords 302 can be manufactured in a number of cross sectional shapes. One particularly advantageous cross sectional shape is shown in FIG. 29 and generally designated as elastomeric cord 302A. Cord 302A has a cross sectional shape generally comprising a pair of trapazoids 320 and 322 having their lower, larger bases 324 and 326, respectively, interconnected by a shorter third trapazoid 328 inverted such that the third trapazoid has its shorter, lower base 330 aligned with the larger, lower bases 324 and 326 of the two interconnected trapazoids 320 and 322 to form a flat guide roller contacting surface generally designated as 332. The two larger, interconnected trapazoids 320 and 322 include tits or protrusions 334 and 336 on their upper, shorter bases 338 and 340 for gasket support over a relatively small area. A plurality of such cords 302A can be aligned to evenly space the protrusions 334 and 336 to support any desired size of gasket. The cord 302A is generally extruded as an integral cord and can be provided with one side extending inverted trapazoidal leg (not shown) shaped the same as central trapazoid 328, to space an adjacent cord 302A therefrom.

VARIOUS MODIFICATIONS AND SUMMARY OF OPERATION

Referring to FIGS. 21 and 22 which illustrate diagrammatically the sequence of operations previously described and the apparatus for performing these operations (but with some modifications thereof), it will be seen that gaskets of various materials, thicknesses, shapes and sizes are placed on a charging conveyor 12 which may be of the type shown in FIG. 5 and are delivered to a pre-heat oven 200 having radiant heaters 201 and 202 above and below the conveyor belt for pre-heating the gaskets supported on the belt to a temperature normally between 130° and 250° F. The conveyor speed is adjustable and is normally between 40 to 60 linear feet per minute.

As will be seen in FIG. 1 the charging conveyor 12 runs at an incline to the pre-heat oven 14 so as to allow working room underneath the pre-heat oven and the other equipment which follows in sequence. The charging conveyor 12 is so designed that it can be extended, raised or lowered for the handling or various shapes, sizes, thicknesses and types of materials.

Referring again to FIG. 21, at the discharge end of the pre-heat oven, the pre-heated gasket parts are delivered to a short transfer conveyor 203, which may have heat applied as required to help the pre-heated gaskets retain their heat, and as an aid in delivering the gaskets from the charging conveyor 12 to the feeder conveyor 203, an auxiliary vacuum type feeder 204 may be used which consists of a porous fabric belt which has suction applied to it by a vacuum box 205 in a manner well known in the art for effecting transfers between adjacent belt conveyors.

Inasmuch as the equipment of this invention in designed to handle a multitude of sizes, shapes and thicknesses of gaskets, there will be some gaskets which may be very thin and flexible, and it is this type that has need of the auxiliary belt 204 and vacuum box 205 for insuring that the lead edge of the die cut part will pass properly onto the transfer conveyor 203. For stiffer, more rigid gasket structures, the belt 204 and vacuum box 205 may not be needed. The gasket parts after being received on the transfer conveyor 203 are fed into the nip of the "mop" rollers generally designated 206, which are fed from upper and lower coater reservoirs 207 and 208 respectively, and here the parts receive the polymeric and resin coating as previously described.

When the gasket parts reach the coating rollers 206, they are at or near the pre-heat temperature, and, of course, are almost, if not entirely dehydrated. The contained heat in the gasket causes almost instantaneous vaporization of the liquid carrier for the coating material as the part passes through the coating rolls with the result that there is substantially no penetration of the liquid into the part and there is a drying of the coating material from the inside out which is highly desirable because in this way bubbling or ballooning of the coating is avoided.

It has been found in practice that with automobile pan gaskets, for example, the leading edge of the gasket is substantially tack-free even before the trailing edge of the pan gasket has left the coating rolls, which illustrates the typical action which takes place.

Although in some instances a separate drying section, such as indicated at 209, may not be necessary before allowing the part to go into the curing oven, generally designated 210, it is nevertheless desirable to provide such a drying section 209 in order to accommodate specific gasket materials, shapes and sizes which do require some additional drying to have the part achieve a tack-free condition before going into the curing oven 210. It is also desirable as a practical matter to have a drying section such as indicated at 209 in order to provide an intermediate inspection station for the coated part before effecting the cure. The drying section, when provided, includes a conveyor belt 211 which is separately adjustable as to speed and which is adjusted to a speed equal to or greater than that of the charging conveyor so as to bring the coated gasket to the curing oven at exactly the right state of pre-cure drying so that when the part enters into the curing oven, the coating will cure in a smooth and uniform manner. In some cases, this may not require that the coated part be tack-free before entering the curing oven.

The drying section 209 has an adjustable hood 212 over it which may be moved up and down as needed to permit inspection and to provide for the best drying action.

An exhaust fan is diagrammatically indicated at 213. Of course, instead of using an exhaust fan over the drying station, a plurality of blower fans could be used to speed up drying with equivalent or superior results.

The drying section conveyor 211 has a wash station generally designated 214 with a scrubber 215 for keeping the belt clean.

A vacuum belt 216 with vacuum box 217 similar in all respects to the belt 204 and vacuum box 205 is provided between the drying section conveyor 211 and the discharge conveyor 218 which moves the parts through the curing oven 210 to a turn-around roll 219 (FIG. 22) located at ground level. The vacuum belt units 216 and 204 are desirably adjustable to and from operable position.

The curing oven 210 has infra-red heaters 220 above and below the belt 218 which also may be of the type shown in FIG. 5 so that heat from both upper and lower radiant heaters can readily reach the polymeric coating for curing.

The discharge conveyor 218, like the charging conveyor 12, is separately adjustable as to speed although its speed is normally equal to or greater than that of the charging conveyor so as to prevent pile-up of parts.

As the gaskets with their cured coating travel downwardly along the discharge conveyor 218 to the turn-around roll 219, they are assisted in making the turn around the latter roll by means of a cord conveyor belt, generally designated 221, comprising, by way of example, a plurality of 3/16" diameter, high tensile, temperature resistant, parallel cords spaced apart approximately ½" and extending across the width of the discharge conveyor 218. This cord conveyor belt 221, which is diagrammatically shown, insures that the coated gaskets which have now been cured make the turn around the roll 219 and will now travel along the section 222 of the conveyor 221.

From this point the gaskets may either proceed directly to a conveyor 223, taking the parts to an inspection and boxing area, or to a release coating unit, generally designated 224, may be rolled into place between the conveyor 221 and the conveyor 223 for applying a suitable release coating. The release coating unit 224 may be of any conventional form and is capable of providing a release coating to both sides of each gasket, with the release coating being compatible with the type of coating applied by the mop rolls 206. The types of polymer materials used as the release coating should have the requisite resistance to heat, chemicals, and solvents in accordance with the environment in which the gaskets are to be used and whether they will be subjected to elevated temperatures. Particular polymers, elastomers and resins selected will be chosen for their respective properties suitable to the environmental condition of particular applications, and relative proportions will be varied as dictated by conditions. All this is well-known in the art.

It will be understood that in the apparatus just described there is a wide range of adjustability to suit varying conditions. Not only are the various conveyors adjustable as to speed, but also there are many ways in which temperature control may be achieved at various stages of the process to suit particular conditions. For example, the spacing of the radiant heaters in the pre-heat oven 200 and those in the curing oven 210 with respect to associated conveyor belts may be varied as well as the input to these radiant heaters. Also the transfer conveyor 203 may have heat applied to it in order to deliver the preheated gasket material to the coating rollers 203 at the desired pre-heat temperature.

It has also been found that when the drying section 209 is used, it is more advantageous to have the fan 213 circulate room air very lightly over the coated gaskets rather than heated air since in the latter case the heated air appears to form a film over the coating so that when the coated gaskets reach the curing oven and receive the first shock of the high intensity heat required for curing, the gaskets are unable to "breathe" and thereby tend to entrap air and other gaseous material beneath the coating, resulting in bubbling and unevenness of the coating. However, the drying section may often be dispensed with due to the retained heat in the coated gasket.

A matter of great significance is the fact that when the coated gaskets are introduced into a curing oven of the type herein described wherein radiant heaters may be effectively used above and below the gaskets to effect a cure of the polymer coating, the curing time may be reduced to as little as a minute and a half as opposed to the fifteen or eighteen minutes required for curing when gaskets were produced by the prior art dip coating method and then hung up to dry and be cured.

While there has been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Apparatus for continuously coating gasket parts of various sizes, shapes, thicknesses and material comprising a pre-heating station; a coating station; a drying station; a curing station; conveyor means for conveying gasket parts flat-wise successively through said pre-heating, coating, drying and curing stations; means for controlling the amount of heat delivered to the gasket parts as they travel through the pre-heating station to achieve a gasket part temperature of about 150°–250° F. at said coating station; means for applying a thin coating of a water suspension of a polymer having a coating thickness on the order of from 0.0005 to 0.005 inches to said gasket parts at said coating station; means for circulating air over the drying station; and means for varying the speed at which the gasket parts are moved through said stations.

2. Apparatus for continuously applying a fluid-impermeable coating to gasket material comprising:
   means for pre-heating said gasket material to a temperature sufficient to prevent any substantial penetration of water into said gasket material when said gasket material, at said pre-heated temperature, is contacted with an aqueous dispersion of a polymer;
   means for coating said gasket material while at said temperature with a coating thickness of from 0.0005 to 0.005 inches of an aqueous dispersion of said polymer;
   means for drying said coating to a tack-free condition; and
   means for curing said coating.

3. Apparatus as defined in claim 2 wherein said means for pre-heating said gasket material includes radiant heaters to pre-heat said gasket substantially uniformly throughout its thickness.

4. Apparatus as defined in claim 2 wherein said gasket material includes an upper major surface and a lower major surface and wherein said means for drying said coating includes a wire mesh conveyor belt including raised portions for contacting said coated gasket material on 30% or less of the coated surface of its lower major surface as conveyed through the drying means to prevent permanent damage to the coating.

5. Apparatus as defined in claim 2 wherein said means for drying said coating includes a conveyor having a plurality of angle bars for conveying said coated gasket through said drying means, each of said angle bars including connected leg members having an inclined angle therebetween of less than 180°, said two legs joining to form a gasket supporting elongated apex extending substantially across the width of the conveyor, a plurality of said apexes of said angle bars lying in a substantially horizontal plane when traveling through said drying means.

6. Apparatus as defined in claim 5 wherein said apex includes a plurality of spaced gasket support members.

7. Apparatus as defined in claim 1 further including means for supporting said gasket parts through said drying means in a substantially horizontal position, said supporting means including a conveyor comprising a plurality of rigid strips having attached thereto a plurality of pointed projections extending substantially normal to said strips and tapered upwardly from said strips to support said gasket parts on a plurality of points through said drying means, said rigid strips connected to a moving conveyor means for moving said strips from an entrance to said drying means to an exit from said drying means for conveyance of said coated gasket parts into said curing means.

8. Apparatus as defined in claim 7 wherein said pointed projections support said gasket parts in substantially a horizontal plane through said drying means.

9. Apparatus as defined in claim 2 wherein said means for drying said coating includes a needle-type conveyor comprising a movable conveyor member having attached thereto a plurality of sharply pointed projections; said pointed projections having one end attached to said movable conveyor member and a second, pointed end extending upwardly, substantially normal to said conveyor member; said points of said projections being sufficiently closely spaced such that said projections are capable of supporting said gasket material, with said gasket material lying substantially horizontally in contact with some of said points for conveyance through said drying means; said points of said pointed projections in contact with said gasket material lying in substantially the same generally horizontal plane during conveyance of said gasket material through said drying means.

10. Apparatus for coating a relatively flat, water-penetrable article with an aqueous-dispersible polymer, including means for preheating said water-penetrable article while still lying flat; means for coating said preheated article with from 0.0005 to 0.005 inches thickness of an aqueous dispersion of a polymer; means for drying said coated article to a tack-free condition; and means for curing said coating on said article;
   said drying means including a conveyor having a plurality of raised portions adapted to support said coated article over 30% or less of its lower major surface area while conveyed through said drying means to achieve a tack-free coating at an exit of said drying means.

11. Apparatus as defined in claim 10 wherein said drying means includes a conveyor, having attached thereto a plurality of raised support members for said article generally lying in the same, substantially horizontal plane when supporting a coated article during drying of said article.

12. Apparatus as defined in claim 10 wherein said means for drying said coating includes an elastomeric cord conveyor belt including annular upper portions for contacting said coated article on 30% or less of the coated surface of its lower major surface as conveyed through the drying means to prevent permanent damage to the coating.

13. Apparatus for coating a liquid-penetrable article having an upper major surface and a lower major surface with a liquid-dispersible polymer including means for preheating said liquid-penetrable article;
   means for coating said preheated article with from 0.0005 to 0.005 inches of a liquid dispersion of a polymer;
   means for drying said coated article to a tack-free condition;
   said drying means including a conveyor having a plurality of elastomeric cords adapted to support said coated article over 30% or less of its lower major surface area while conveyed through said drying means to achieve a tack-free coating at a exit of said drying means.

14. Apparatus as defined in claim 2 wherein said drying means includes a conveyor, having attached thereto a plurality of elastomeric cord support members generally lying in the same substantially horizontal plane when supporting said coated gasket material during drying of said coated gasket material.

15. Apparatus for continuously coating relatively flat, water-penetrable, gasket members composed of fibers and/or particulate, bound together by an elastomer, said apparatus comprising means for conveying said members flatwise and in random position to a coating station; means for heating said members prior to reaching the coating station to a temperature in the range of 150°–250° F.; means for moving said heated gasket members through the coating station and simultaneously applying a coating to at least one side thereof, with the coating comprising a water suspension of a polymer; whereby residual heat in said member resulting from said heating means prevents substantial penetration of the water from the polymer suspension into the gasket member at said coating station, so that the polymer is deposited on the surface of the gasket member and the water in the coating is substantially instantaneously evaporated; means for drying the gasket members after coating; and means for thereafter curing the coating.

* * * * *

UNITED STATES PATENT AND TRADEMARK OFFICE
CERTIFICATE OF CORRECTION

PATENT NO. : 4,463,704

DATED : August 7, 1984

INVENTOR(S) : Robert G. Farnam

It is certified that error appears in the above—identified patent and that said Letters Patent are hereby corrected as shown below:

Column 23, line 44 of the patent, delete "inclined" and substitute therefor --included--.

Signed and Sealed this

Eighth Day of January 1985

[SEAL]

Attest:

GERALD J. MOSSINGHOFF

Attesting Officer

Commissioner of Patents and Trademarks